W. W. GOODWIN.
GAS LIGHT AND PRESSURE INDICATOR.
No. 7,301. Reissued Sept. 5, 1876.
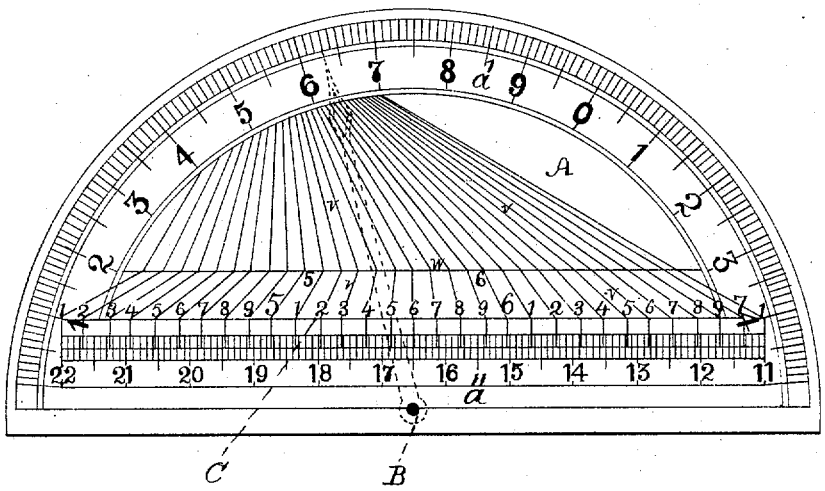
Witnesses:
Benj Morrison.
Wm H. Morrison
Inventor:
William W. Goodwin
N. PETERS, PHOTO-LITHOGRAPHER, WASHINGTON, D. C.

UNITED STATES PATENT OFFICE.

WILLIAM W. GOODWIN, OF PHILADELPHIA, PENNSYLVANIA.

IMPROVEMENT IN GAS-LIGHT AND PRESSURE INDICATORS.

Specification forming part of Letters Patent No. 138,016, dated April 22, 1873; reissue No. 6,254, dated January 26, 1875; reissue No. 7,301, dated September 5, 1876; application filed August 21, 1876.

*To all whom it may concern:*

Be it known that I, WILLIAM W. GOODWIN, of the city of Philadelphia, in the State of Pennsylvania, have invented a new and useful Improvement in Jet-Photometers, which improvement is fully set forth in the following specification, reference being had to the accompanying drawing, in which my said improvement is shown as applied to the ordinary dial-plate of a jet-photometer.

The object of my invention is to dispense with the use of the separate diagram or chart heretofore required to be resorted to in finding the illuminating or candle power of the gas burning at the jet-tip of the photometer, especially in the jet-photometer of Lowe as improved by Kirkham and Sugg, of England; and this object I attain by the construction and combination, with a jet-photometer, of a candle-power scale, in such a manner that, in testing the illuminating quality of any gas burning at the jet-tip of the photometer, the candle-power of the gas—say, from eleven to twenty-two candles, inclusive—will be indicated distinctly and accurately by the index bar or pointer, as will now be fully and accurately described and explained.

*a'* is the usual pressure-scale inscribed along on the semicircular portion of the face of the dial-plate A, the usual index bar or pointer B being shown by dotted lines. *a''* is a candle-power scale, shown horizontally upon the lower portion of the face of the said dial-plate A, divided into eleven equal spaces, which are numbered regularly from 11 at the right to 22 at the left hand end, and each of the said spaces subdivided into tenths, thus providing a scale of tenths from the lowest to the highest candle-power required to be known in testing the illuminating-power in candles of the gases which may be submitted to the test. These numbered divisions and subdivisions constitute my candle-power scale *a''*, and might be inscribed upon the arc traversed by the index bar or pointer; but, as the range of pressure required to support a jet-flame seven inches high in said jet-photometer with gases from 11 to 22 candle-power is only .41 to .71 inches, inclusive, and as the space occupied by the said hundredths of the pressure-scale *a'* is too small to admit of sufficiently-visible numerals indicative of the divisions which are between 4 and 5, 5 and 6, and 6 and 7 of said scale *a'*, and is also entirely too short to admit of sufficiently visible subdivisions for showing the requisite spaces for the eleven candles and their fractional parts, I have constructed an elongation of that short portion of the pressure-scale *a'* by inscribing a horizontal line upon the lower portion of the face of the dial-plate A, dividing that line into three equal parts, numbered to correspond with the numerals 4, 5, 6, 7 of the pressure-scale *a'*, and subdividing these parts into tenths, and numbering the tenths of each of the three divisions from the left to the right hand, thus producing a lengthened pressure-scale, C, having the requisite divisions and subdivisions of pressure so clearly shown as to be quickly seen by the inspector, and below this scale C I have inscribed the horizontal candle-power scale *a''*, corresponding in length with the scale C, divided into eleven spaces, numbered from 11 candles at the right to 22 candles at the left hand, and correspondingly subdivided into tenths, so that the inspector has only to observe the position of the index bar or pointer B as affected by the pressure under which the gas is burning a seven-inch flame, and thus see the candle-power of the gas.

The divergent and oblique lines V V and the horizontal line W are not intended to be applied to the dial-plates for any practical purpose, and may be dispensed with entirely, my object in showing them in the drawing being merely to demonstrate the exact correspondence between the numerals 4, 5, 6, 7 and the divisions of tenths between them of the pressure-scale *a'*, with the numerals and tenths of the lengthened pressure-scale C.

As it is well known that the theory of Kirkham and Sugg is correct—*i. e.*, "maintaining a seven-inch flame from an orifice of certain fixed dimensions, the illuminating power of gas is in direct proportion inversely as the pressure"—it will be seen that my candle-power scale *a''* is constructed and applied in accordance therewith, viz: If the gas be burning a seven-inch flame under a pressure of .71 the candle-power of the gas will be shown to be eleven candles; and if it be burning under a pressure of .41, the candle-power of the gas will be shown to be twenty-two candles, and so for any intermediate pressure, the rate being, as I have found by accurate calculation, 1. 1 candle-power corresponds with .03 pressure, and hence the valve in pressure required to give one-tenth of a candle is .0027+ of an inch acting inversely, as aforesaid.

It will, therefore, be readily understood without further explanation, that under whatever pressure the gas may be burning a seven-inch flame at the jet-tip of the photometer, its candle-power will be seen by an inspection of the candle-power scale.

I claim as my invention—

1. The combination, with a jet-photometer, of a candle-power scale, substantially as and for the purpose hereinbefore set forth.

2. The combination in a jet-photometer, substantially as described, of the candle-power scale $a''$ and the horizontal pressure-scale C with the arched-pressure-scale $a'$, and the index bar or pointer B, for the purpose set forth.

WILLIAM W. GOODWIN.

Witnesses:

BENJ. MORISON,

W. H. MORISON.